W. B. PAYNE.
CHECK WRITER.
APPLICATION FILED MAR. 4, 1919.
1,389,215.
Patented Aug. 30, 1921.
7 SHEETS—SHEET 1.
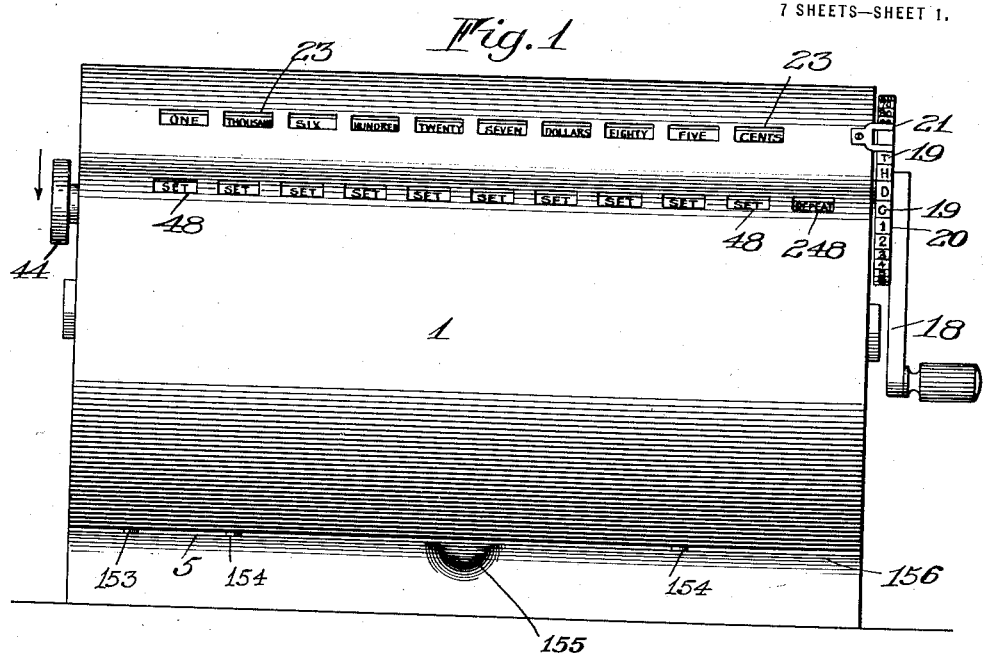
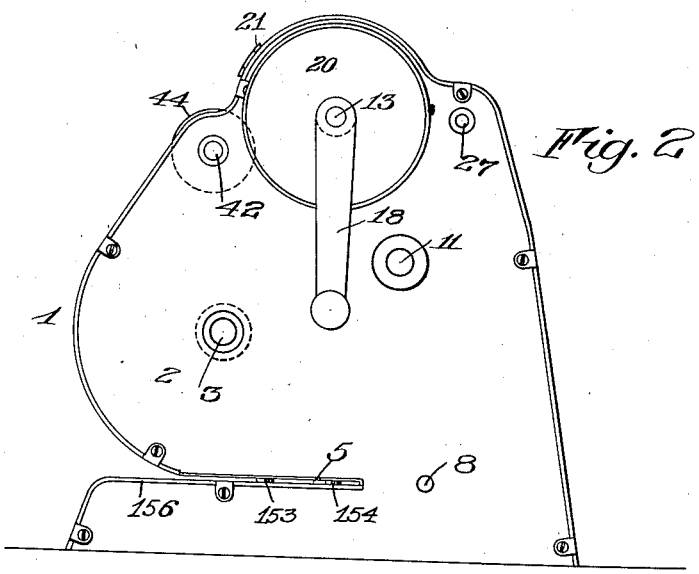
INVENTOR
Walter B. Payne
BY
ATTORNEY

W. B. PAYNE.
CHECK WRITER.
APPLICATION FILED MAR. 4, 1919.

1,389,215.

Patented Aug. 30, 1921.
7 SHEETS—SHEET 2.

INVENTOR
Walter B. Payne

BY
[signature]
ATTORNEY

W. B. PAYNE.
CHECK WRITER.
APPLICATION FILED MAR. 4, 1919.

1,389,215

Patented Aug. 30, 1921.
7 SHEETS—SHEET 3.

INVENTOR
Walter B. Payne

BY
ATTORNEY

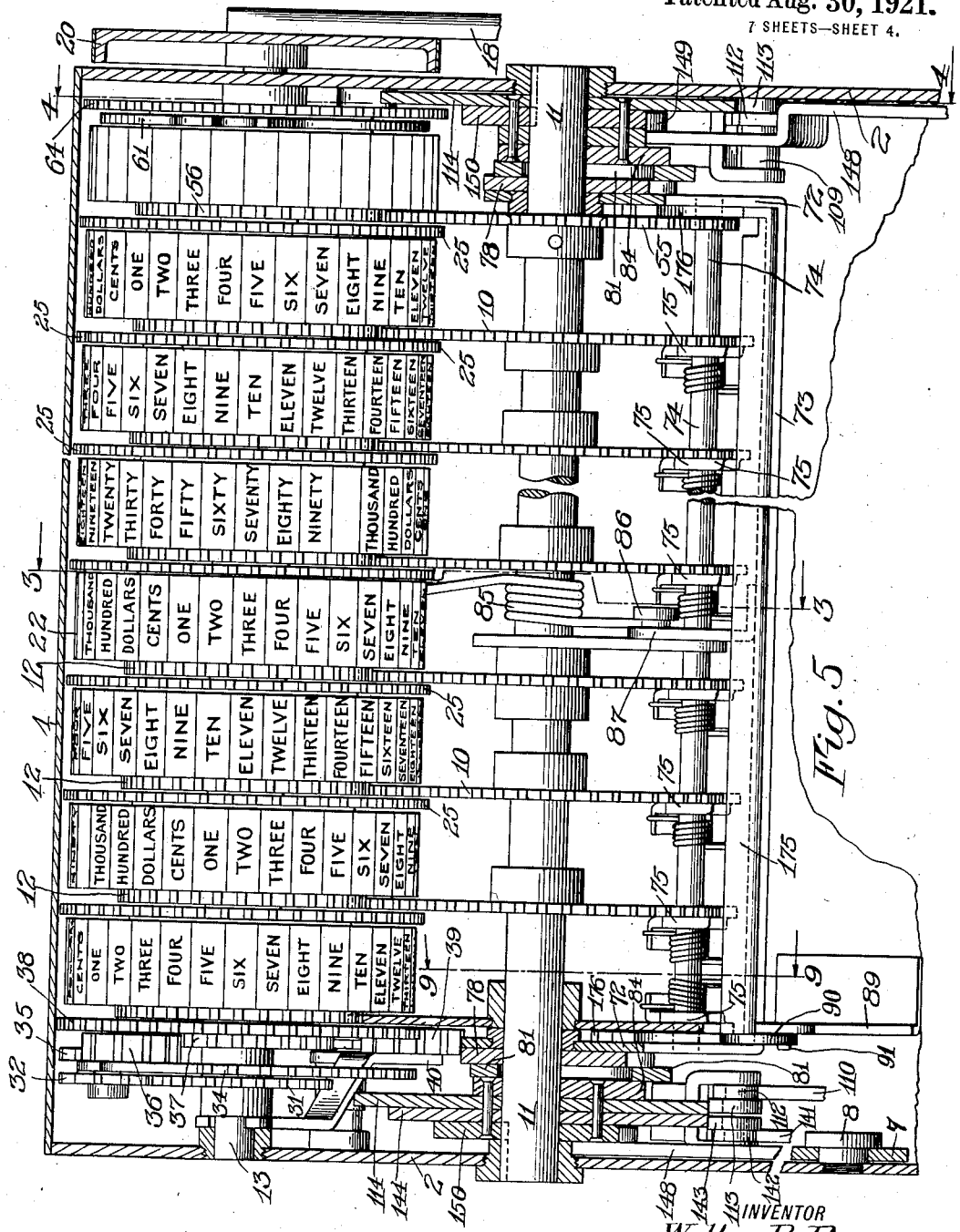

W. B. PAYNE.
CHECK WRITER.
APPLICATION FILED MAR. 4, 1919.
1,389,215.
Patented Aug. 30, 1921.
7 SHEETS—SHEET 5.
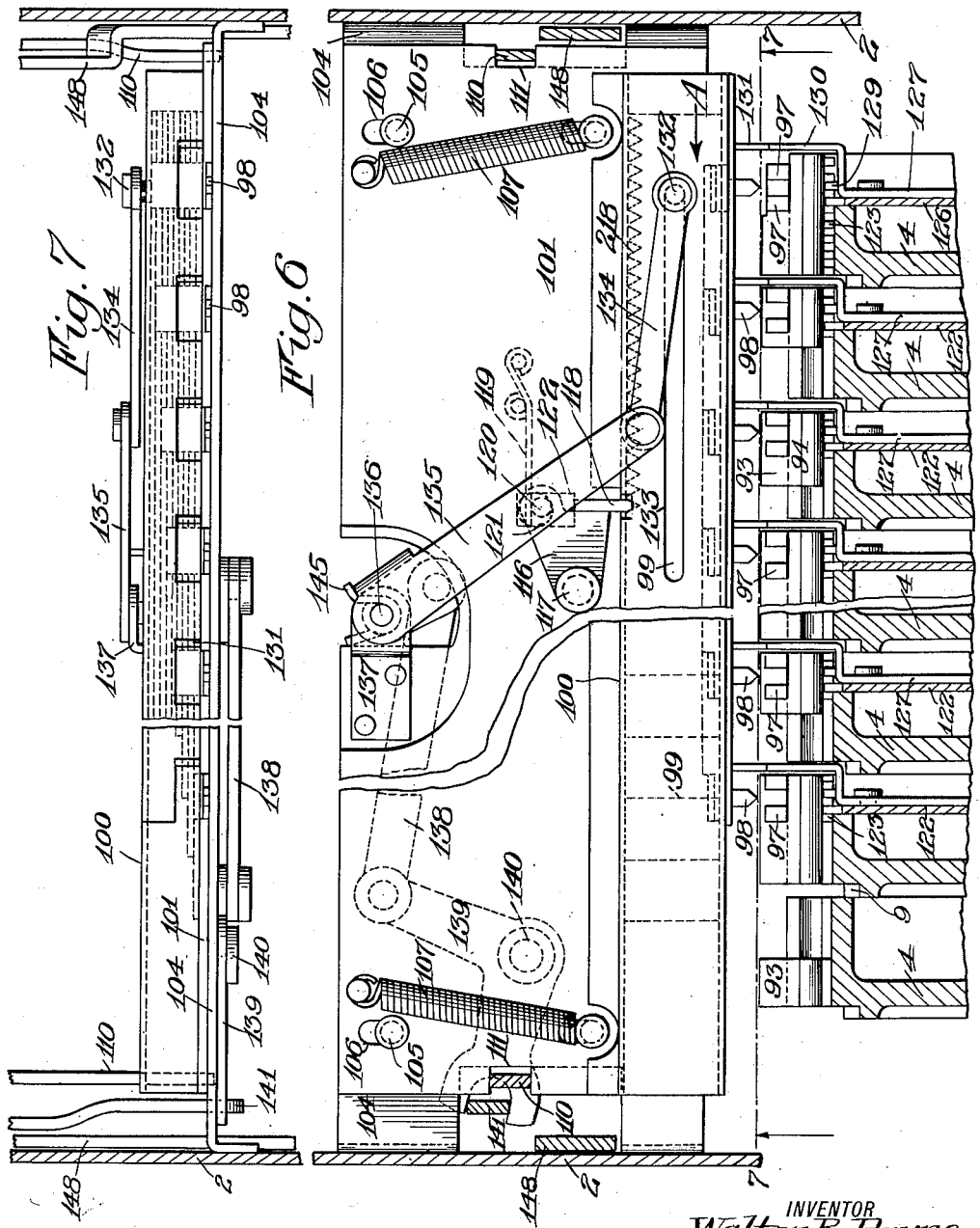
INVENTOR
Walter B. Payne
BY
ATTORNEY

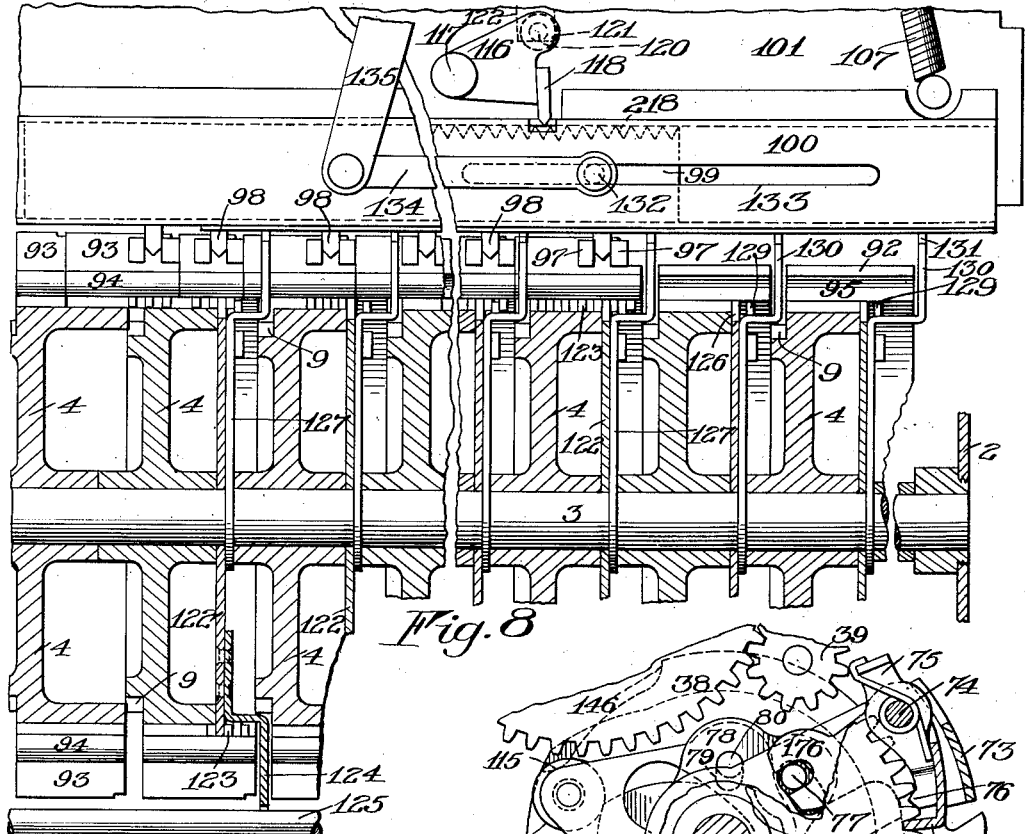

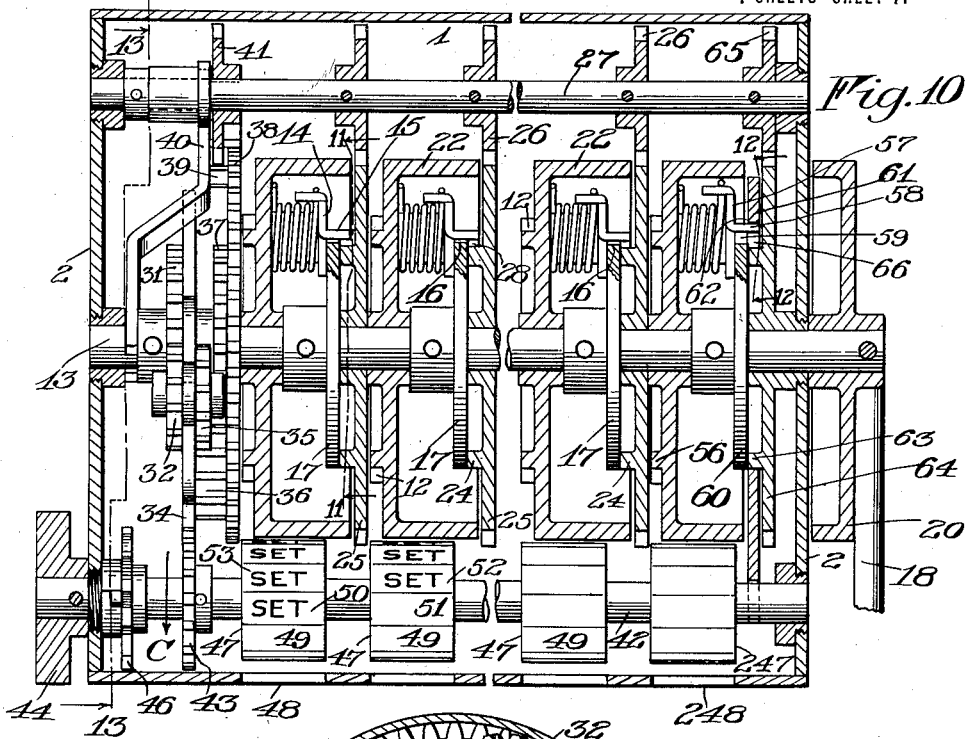

UNITED STATES PATENT OFFICE.

WALTER B. PAYNE, OF ROCHESTER, NEW YORK, ASSIGNOR TO TODD PROTECTOGRAPH COMPANY, OF ROCHESTER, NEW YORK, A CORPORATION OF NEW YORK.

CHECK-WRITER.

1,389,215.  Specification of Letters Patent.  Patented Aug. 30, 1921.

Application filed March 4, 1919. Serial No. 280,592.

*To all whom it may concern:*

Be it known that I, WALTER B. PAYNE, a citizen of the United States of America, and a resident of the city of Rochester, in the county of Monroe and State of New York, have invented certain new and useful Improvements in Check-Writers; and I hereby declare the following to be a full, clear, and exact description of the same.

The present invention relates to printing machines of the kind known as check protectors, and it has for its broad object to provide such a machine by which all of the words or characters designating a monetary amount may be set up in a line and printed simultaneously and repeated as often as desired without disturbing the original setting.

A further object is to provide a machine in which a plurality of type carriers, each having a series of words or other characters thereon, are arranged side by side, each of the carriers being capable of movement by a common setting member to bring any desired character to a common printing line.

Another object is to provide a machine in which the left hand end of the line which is set upon the type carriers always occupies a fixed position so that the impression made therefrom may always begin at a fixed distance from the end of a check.

A further object is to provide means whereby the type carriers may be shifted simultaneously by the setting member and released successively as the desired characters are brought to the printing line.

Still another object is to provide a machine employing a series of type carriers arranged side by side, in which the type carriers are positioned successively, beginning with the carrier at the extreme left of the series.

A further object is to provide means whereby any type character may be readjusted prior to making an impression from the printing line in case of erroneous setting.

A still further object is to provide a machine employing a platen for impressing a check against the type row set up, in which the printing impression is made by a movement of the setting member after the latter has been used for positioning the type carriers.

Another object is to print the checks with the words of the amount of varying length according to the number of letters therein with uniform spacing between words.

To these and other ends the invention consists in certain improvements and combinations of parts, all as will be hereinafter more fully described, the novel features being pointed out in the claims at the end of the specification.

In the drawings:

Figure 1 is a front elevation of a check printing machine constructed in accordance with the present invention.

Fig. 2 is an end view thereof looking from the right in Fig. 1.

Fig. 5 is a sectional view on the line 5—5 of Fig. 3.

Fig. 6 is a similar view on the line 6—6 of Fig. 4.

Fig. 7 is a detail sectional view on the line 7—7 of Fig. 6.

Fig. 8 is a view similar to Fig. 6 showing the type bars bushed together.

Fig. 9 is a detail sectional view on the line 9—9 of Fig. 5.

Fig. 10 is a horizontal sectional view on line 10—10 of Fig. 4 showing the setting devices for the type wheels.

Fig. 11 is a detail sectional view on the line 11—11 of Fig. 10 showing the setting and releasing devices for the type wheels.

Fig. 12 is a similar view on the line 12—12 of Fig. 10 showing the driving device for the operating shaft.

Fig. 13 is a vertical sectional view on the line 13—13 of Fig. 10 showing the differential mechanism for releasing the type wheels.

Figure 3:
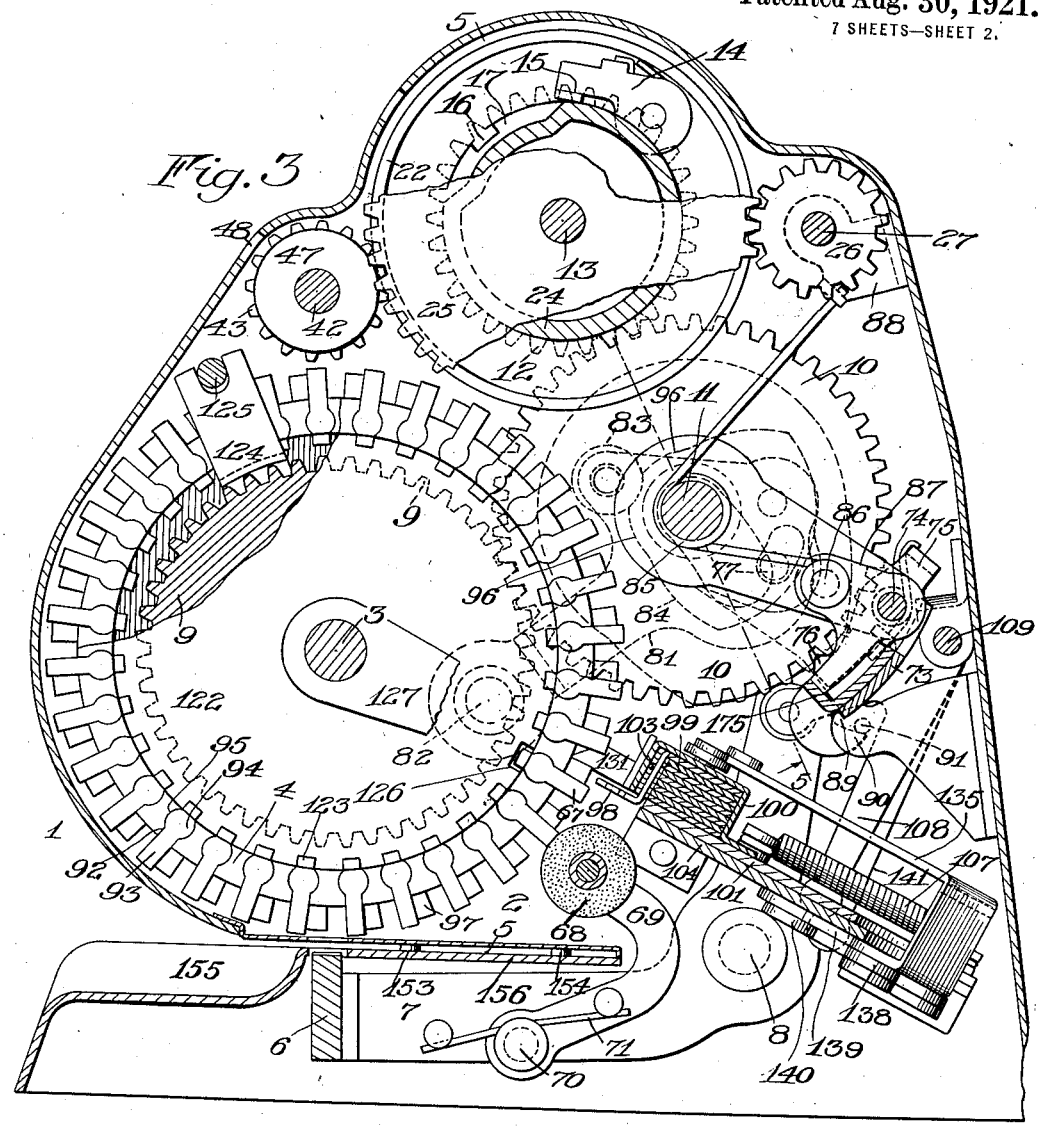
Fig. 3 is a central vertical sectional view on the line 3—3 of Fig. 5.
Figure 14:
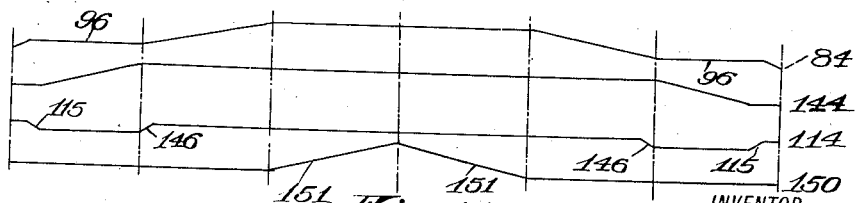
Fig. 14 is a diagram of the cams on the operating shaft.

A machine constructed in accordance with the present invention embodies a casing 1 comprising end walls 2 supporting a rod 3 on which a plurality of similar type wheels 4 are arranged side by side. Beneath the type wheels the casing is slotted at 5 to receive the check and beneath the slot is a platen 6 for coöperation with the type wheels, extending between the ends of levers 7 pivoted upon studs 8 on the inner sides of the end walls 2.

*Type wheel positioning mechanism.*—The type wheels are provided with a plurality of slidably mounted type bars equally spaced around their faces, each type wheel containing all the words that are required to print a monetary amount. The several type wheels are independently rotatable to bring any word on each to a common printing line and to this end each carries a gear 9 (Fig. 3) meshing with an intermediate gear 10 loose on an operating shaft 11, the gears 10 in turn meshing with gears 12 loose on a setting shaft 13. The shafts 11 and 13 are journaled in bearings carried by the end walls 2 of the frame. The gears 12 carry clutch members in the form of spring actuated dogs 14 having offset ends 15 adapted to engage within notches 16 in the peripheries of circular disks 17 fast on the setting shaft. The latter is revolved by a hand crank 18 (Figs. 1, 2 and 10) and when all the dogs 14 are engaged in the notches 16, rotation of the shaft will shift the type wheels simultaneously to bring any desired words thereon to a printing line, the positioning of the words being determined by means of characters 19 on a dial 20 fast to the shaft 13 and coöperating with an index 21 on the casing. Each of the type wheels has a blank space, and when the type wheels are connected to the setting member, the position of the blank spaces on the printing line is indicated by a blank space on the dial 20 registering with the index 21. Integral with the gears 12 are flanges 22 on which appear words corresponding to those on the type wheels, these words being visible through apertures 23 in the casing.

In setting the type wheels to print the words of a monetary amount, they are rotated simultaneously by the crank 18 until the first word of an amount is indicated by the index 21. The first type wheel is then disconnected from the setting shaft, so that further motion of the latter will not disturb its positon. This procedure is repeated with the successive type wheels until all have been disconnected. Mechanism for accomplishing this purpose will now be described.

*Type wheel releasing mechanism.*—The dogs 14 are raised out of the notches 16 to disconnect the type wheels by means of a series of cams 24 carried by gears 25, loosely mounted on the shaft 13, and each arranged in juxtaposition to one of the driving disks 17. The gears 25 mesh with a series of pinions 26 fast on a counter shaft 27 journaled in the frame, and the counter shaft is driven through gearing from the shaft 13, so that all of the cams have a movement in the same direction and with the same angular speed as the shaft 13. These cams are provided with notches 28 adapted to receive the offset ends 15 of the dogs 14 when they are engaged in the notches 16 of the disks 17. These notches 28 have inclined walls at one end so that when the cams are moved relatively to the shaft 13 in the direction of the arrow in Fig. 11, the portion 15 rides up the incline and is lifted out of the notch 16 in the driving disk.

In order to release the dogs 14, successively, the notches 28 in the cams are of varying length as shown in Fig. 11, the notch in the first cam at the left side of the machine terminating at the incline 29, while the notch in the tenth cam extends about half way around the circumference, terminating at the incline 30, the notches in the intermediate cams being graduated in length between the two extremes. It will be seen that with the construction described, the type wheels may be disengaged successively from the setting shaft by imparting a step by step motion to the cams, which causes the dogs 14 to be lifted one after another until all are disengaged.

This step by step motion is obtained in the following manner: The shaft 13 has fixed thereto a gear 31 (Fig. 10) with which meshes a pinion 32 on a short shaft 33, rotating in a shiftable gear segment 34 loosely mounted on the shaft 13; the shaft 33 carrying at its opposite end a pinion 35, meshing with a pinion 36, also carried by the segment 34. The pinion 36 meshes with a gear 37 of the same diameter as the gear 31 and movable with a larger gear 38, rotating loosely on the shaft 13, and meshing with an intermediate pinion 39 carried by a stationary support 40. The pinion 39 meshes with a pinion 41 fast to the shaft 27.

From the above description it will be seen that, assuming the gear segment 34 to be stationary, and the shaft 13 revolving in the direction of the arrow A, Fig. 13, the gear 38 would be revolved in the opposite direction at the same angular speed, and through the intermediate gear 39, the motion of the latter is reversed and transferred to the cams through the shaft 27 in the same direction as that of the shaft 13, so that no relative motion between the disks 17 and cams takes place. Assuming now that the shaft 13 remains stationary and the segment 34 is revolved in the direction of the arrow B, the differential gearing causes the gear 38 to be advanced in the same direction through twice the angle and, through the reversing pinion, the cams are stepped ahead relatively to the shaft 13 in the direction of the arrow in Fig. 11.

In order to conveniently move the gear segment 34, there is provided a shaft 42 journaled in the frame, having fixed thereon a pinion 43 meshing with the segment and a knob 44 at its left end exterior of the casing by means of which it may be rotated. A spring actuated dog 45 (Fig. 13) bears against a toothed wheel 46 to offer considerable resistance to the turning of the shaft, as the movement of the shaft 13 and cams in unison can take place only when the gear segment 34 is stationary.

It is also desirable to be able to ascertain readily just which type wheels are disconnected and to obtain this result, a series of cylindrical portions or drums 47 (Fig. 10) are provided on the shaft 42, having indicating words thereon which appear in succession through apertures 48 as the shaft is rotated. When all of the type wheels are connected ready to be set, blank spaces 49 on the drums appear through the apertures 48.

Upon revolving the shaft one step in the direction of the arrows C in Figs. 10 and 13, the first type wheel at the left hand side of the machine is disconnected and the word "Set" indicated by 50 on the first drum 47 will appear through the extreme left aperture 48. The blank space 51 on the second drum will then appear through the second aperture. When the second type wheel is disconnected, the word "Set" indicated by 52 on the second drum will appear through the opening, another word "Set" being provided at 53 on the first drum to take the place of the word at 50, which is then moved out of registration with the aperture. This same arrangement is continued on all of the drums, so that as the type wheels are successively disconnected, the fact will be indicated by the simultaneous appearance of the word "Set" on the drum corresponding to the last type wheel disconnected.

*Operating shaft connecting mechanism.*—When the shaft 42 is turned to cause the release of the last type wheel, the setting shaft 13 is automatically connected to drive the operating shaft 11, from which is derived the movements required to complete the remaining operations necessary for printing the check. The driving is accomplished by mechanism similar to that for connecting the type wheels, and embodies a gear 55 (Fig. 5) fixed on the operating shaft and meshing with a gear 56 loose on the setting shaft, the gear 56 carrying a spring actuated dog 57 (Fig. 12) having an offset end 58 adapted to engage in a notch 59 in the periphery of a disk 60 fixed to the shaft 13.

Figure 4:
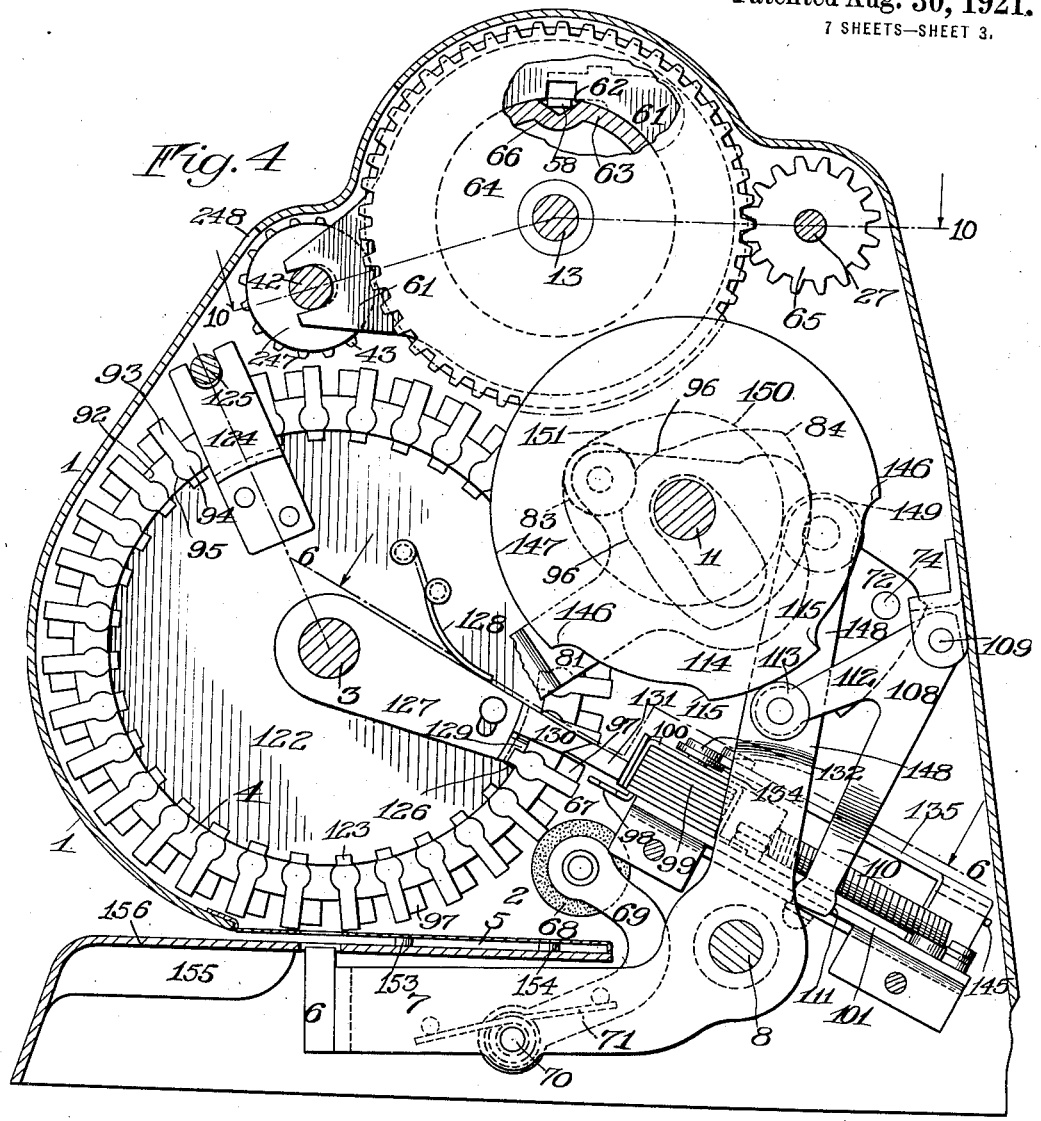
Fig. 4 is a vertical sectional view on the line 4—4 of Fig. 5.

The gear 56 is held against movement when one or more type wheels are connected by a stationary plate 61 (Figs. 4, 10 and 12) which has a central opening therein, and (as shown in Fig. 4) is held against rotation by a fork extending over the shaft 42. The offset end 58 of the dog 57 occupies a notch 62 in the edge of the central opening in the plate and is held in said notch by riding on the periphery of a cam 63 extending into said opening, the cam being fixed to a gear 64 loose on the shaft 13 adjacent the disk 60. The cam 63 is driven from the shaft 27 by a pinion 65 thereon meshing with the gear 64. The cam has a notch 66 in its periphery which is brought into registration with the notch 59 as the last type wheel is disconnected. If this happens when a word appears through the last aperture 23, the notch 59 in the disk 60 will not be opposite the offset end 58 of the dog, consequently it will be necessary to revolve the shaft 13 until the index is opposite the blank space on the dial 20, when the dog will drop into the notch. If, however, the number of words required in the amount is less than the total number of type wheels, the shaft is turned to the blank position immediately after setting the last word and the remaining type wheels released with their blank spaces on the printing line. In this case the end 58 of the dog is opposite the notch 59 before the release of the type wheels, being prevented from dropping into it by the cam. Upon release of the last type wheel, the cam is moved out of the way and the dog can immediately drop into the notch. In releasing the operating member, the setting shaft 13 is turned to bring the dog directly opposite the notch 62 in the stationary plate and the cam then turned to raise the dog into said notch and out of the notch in the driving disk. It will be seen that it is impossible to release the operating member in any other position than the one described, as it is impossible to cause relative motion of the disk 60 and cam 63 when the setting shaft is in any but blank position owing to the fact the end 58 of the dog bears against the inner edge of the central opening in plate 61 and, therefore, the cam can not be rotated relatively to the disk 61 to raise the dog out of the notch.

The shaft 42 is preferably provided with a drum 247 carrying the word "Repeat" which is visible through an aperture 248 in the casing simultaneously with the appearance of the word "Set" through the aperture 48 of the last type wheel. This word indicates that the operation of making an impression from the line set up can be repeated as often as desired without changing the setting.

*Correcting errors.*—After setting the type wheels, if it should be observed from an inspection of the words appearing through the apertures 23, that one of the type wheels is incorrectly set, the knob 44 can be turned backward until a blank space shows through the aperture 48 corresponding to the erroneously set type wheel.

This action alines the dogs 14 and the cam notches 28 for this type wheel and those to the right thereof. The setting member is now rotated a sufficient distance for the dogs to drop into the notches 16 of the driving disks 17. This action connects the type wheels to the setting member, which is then moved as before described to position the type wheels successively in their proper positions, where they are disconnected by turning the knob 44 forward a step at a time.

*Type wheel rotating mechanism.*—When the type wheels are set, the words thereon which correspond to those appearing through the apertures 23, occupy a location indicated by 67 in Fig. 4. The type wheels are rotated simultaneously at every impression to carry the type row set up from this location to a point opposite the platen prior to operation of the latter, and during this movement the type row contacts the inking roller 68, which extends across all the type wheels. The inking roll is carried by arms 69 which are pivoted at 70 to the platen levers 7, springs 71 serving to act on the arms to hold the inking roller against the surface of the type wheels.

The rotation of the type wheels to printing position is brought about in the following manner: Loosely pivoted on the operating shaft 11 is a yoke frame having the radial portions 72 (Figs. 3 and 9) and connecting portion 73, and carried by this yoke is a rod 74 on which are pivoted a series of spring actuated centering dogs 75 having wedge-shaped ends 76 adapted to engage between adjacent teeth of the gears 10 which drive the type wheels. These centering dogs aid in positioning the type wheels in proper alinement. Also pivoted on the same shaft 74 is a centering member 175 that is rocked about its pivot to enter the space between teeth on the gears 10 to positively lock them to the yoke frame prior to rotation of the latter. To this end, the centering member 175 has crank portions 176 at its ends slotted to receive pins 77 which are carried by arms 78 loose on the shaft 11. The arms 78 are slotted radially at 79 to receive pins 80 on levers 81 pivoted at 82 to the end walls 2 of the casing, and the levers 81 are moved in one direction by engagement of rollers 83 thereon with cams 84 fixed to the shaft 11. The yoke frame is returned by a spring 85 (Figs. 3 and 5) coiled about the shaft 11, one end thereof engaging a pin 86 on a crank portion 87 of the centering member and the other resting against a plate 88 fixed to the frame. It will be seen that this spring serves to return both the yoke frame and the centering member, as the point 86 at which the spring bears is between the pins 77 and the shaft 74, consequently part of the force of the spring is transmitted to the yoke frame to hold it against a stationary stop plate 89 until the motion of the centering member is limited by engagement with the gears 10, after which the yoke frame moves about the shaft 11. If for any reason, a type wheel is not centered in setting, the centering member will not be able to move its full distance and a hook 90 thereon will engage a pin 91 on the plate 89 and thereby prevent the further operation of the machine.

*Type shifting mechanism.*—In the present machine, the type wheels instead of being provided with type bars fixed thereto are provided with a series of uniformly spaced grooves 92 in their faces for the reception of sliding type 93, the type being held in the grooves by means of enlargements 94 received within corresponding portions 95 of the grooves. The grooves in adjacent wheels register so that a type bar carried by one wheel may be slid into the next wheel. The type bars are of varying length so that in order to set up the words designating a monetary amount without having unequal spaces between the words, it is necessary to push the type bars of the set up line together. This is done before inking the line in the present instance, although it is not essential and the type could be pushed together after inking. In the extreme left wheel the type bars are fixed in the slots with their left ends in alinement, and, since they are of varying length, their other ends are in stepped relation, forming differential stops against which the type bars carried by the adjacent wheel are adapted to abut. To hold the type wheels stationary after the operation of the centering member, the cam 84 is provided with concentric portions 96 which allow a dwell while the shifting of the type is taking place.

Figure 15:
Fig. 15 shows the type shifting elements with the channel guide removed.

The type bars to be shifted are as before explained, located at the point indicated by 67 and are all provided with laterally extending projections 97 between which fingers 98 on shifter slides 99 are engaged. These shifters 99 consist of thin superposed plates guided in a channel guide 100 fixed to a supporting plate 101. The plates 99 are shown with the channel guide 100 removed in Fig. 15 and it will be seen that each of the plates has a downwardly extending portion 102, which is received within notches 103 in the edges of the plates below it, and is bent outwardly at right angles beneath the lower edge of the channel 100 (see also Fig. 3) and reduced at its end to form a finger 98. The supporting plate 101 is movable radially of the type wheels, being slidably mounted upon a fixed plate 104 which extends across the frame, by means of headed studs 105 (Fig. 6) projecting through slots 106 therein. This plate 101 is normally urged toward the type wheels by springs 107, the motion being prevented by levers 108 (Figs. 3 and 4) pivoted at 109 to the frame and having arms 110 which engage at their ends in notches 111 in the plate, and arms 112 carrying rollers 113 bearing against the peripheries of disk cams 114. The cams 114 have circumferential depressions 115 which allow movement of the levers 108 and consequent motion of slide 101 toward the type wheels, the fingers 98 engaging between the projecting portions 97 on the type bars. The alinement of the projections 97 and fingers 98 is insured by a locking dog 116 (Fig. 6) pivoted at 117 to the slide plate 101 and having a vertical beveled flange 118 entering V shaped notches 218 in the shifters 99. This dog is rocked about its pivot by a spring 119 on the under side of supporting plate 104, engaging a pin 120 on the dog extending through apertures 1221 and 122 in the slide 101 and supporting plate 104. This dog moves with the slide 101 until the beveled ends of the fingers 98 are between the projections 97 on the type bars, at which instant the pin 120 engages the edge of the aperture 1221 and the movement of the dog is limited. Further motion of the slide 101 carries the shifters clear of the dog so that the latter is ineffective to prevent their motion.

It is also necessary that the type bars themselves be locked except when they are engaged by the shifter fingers. To this end, each type wheel except the one at the extreme left of the machine, is recessed as shown in Fig. 8 to receive a circular plate 122 which engages at its periphery between inwardly extending projections 123 on the type bars. It is unnecessary to apply this locking mechanism to the left type wheel as the type bars therein are fixed. The plates are prevented from rotation by forks 124 (Fig. 3) extending over a cross rod 125 carried by the frame. At a point opposite the set up position 67, each plate has a notch 126 to allow the type bars on this line to be shifted therethrough.

A latch 127 adjacent each plate 122, is pivoted on the rod 3 and normally held in the position shown in Fig. 4 by a spring 128. This latch has an offset portion 129 extending between adjacent projections 123 on the type bars. The outer end 130 of each latch is beveled to coöperate with a similar finger 131 fixed on the guide channel 100. As the slide 101 is moved toward the type wheels the finger 131, engaging the beveled end 130, rocks the latch upwardly and withdraws the offset 129 from engagement with the type bars.

The fingers 98 are by this time in engagement with the type bars and the shifting of the latter takes place as follows: The upper shifter 99 for the type bars in the right hand type wheel has thereon a stud 132 projecting through a slot 133 (Figs. 6 and 8) in the channel 100, and this stud is connected by a link 134 with a lever 135 pivoted at 136 to a bracket 137 on the stationary plate 104. The lever 135 is connected by a link 138 to one arm of a bell crank lever 139 pivoted at 140 to the under side of the plate 104, and its other arm is forked to receive an arm of a lever 141 pivoted at 109 to the frame. The lever 141 has an arm 142 (Fig. 9) carrying a roller 143 which bears against a cam 144 on the operating shaft 11, being held in contact with the arm by a spring 145 coiled about the pivot 136 of the lever 135.

It will be seen that as the shaft 11 revolves, the spring 145 will cause the lever 141 to keep in contact with the cam 144 consequently the upper shifter which is engaged with the last type bar of the line will be moved in the direction of the arrow A, Fig. 6, thereby through engagement of the ends of the type bars pushing all of the type bars together. When the upper shifter is restored, the depending portion 102 thereon engages the shoulders at the ends of the recesses 103 on the other shifters and restores them all to their original position.

The type bars are of lengths which are multiples of the distance between the notches 218 in the shifters, and the projections 123 on the type bars. Consequently when all the type bars are in contact, the notches 218 in the shifter plates are in alinement with the flange on the locking dog 116, and the spaces between the projections 123 are in alinement with the locking plates 122. It will be seen from Fig. 8 that the type bars on the last wheel are of a length to reach from one locking plate 122 to the next, regardless of the length of the word appearing on the face of the type bar. Therefore, before a type bar from this last wheel goes out of control of one locking plate, it reaches a position in which the next plate can coöperate with it. The projections 123 on the intermediate type bars are not required to extend the full length thereof, as it is immaterial whether they are locked, inasmuch as the last type bar of the line is locked. Therefore, when the slide 101 is moved away from the type wheels, withdrawing the fingers 98 from the type bars, the offset portions 129 and the locking dog 116 resume their normal positions, respectively preventing the accidental shifting of the type bars in the line set up, and type shifters themselves. This withdrawal of the slide 101 is brought about by the rises 146 in the cams 114 which restore the levers 108 to their original positions, in which they are maintained by the concentric portion 147 of the cam, during the time that the type wheels are rotated as before described to carry the line which is set up from the point 67, past the inking roller to a point opposite the platen.

The blank bars in the type wheels are preferably of a length equal to the width of the wheels, and are used to fill out a line after the words in the amount are set up. In case the amount set up consisted of only two words, the remaining eight bars in the line would be blanks, and these blank bars serve to transfer the movement of the upper shifter 99 to the two word bars. In this way, the justifying movement required of the shifter is much reduced, thereby permitting a great decrease in size of the machine.

It will be seen that the left end of the printing line is fixed and this feature is of decided importance as it enables checks to always occupy the same position while the impression is being made. To this end an end stop or abutment 153 is carried by the casing and the check is positioned with its left end in contact therewith and with its rear edge in contact with stops 154, prior to making an impression of the type thereon. The stop 153 may be and preferably is positioned so that the impression begins very close to the end of the check, making it impossible to insert a word before the printed line.

The machine is of such length that the ends of a check when positioned against the stops 153, 154, will fall short of the ends of the casing, and to facilitate the insertion and removal of a check from the slot 5, the casing is provided with a recessed portion 155 in the shelf 156 upon which the check rests. The recessed portion extends inwardly as shown in Fig. 3, providing a clearance space for the fingers while the check is being positioned against the stops.

*Platen operating mechanism.*—Each of the platen levers has an upstanding arm 148 carrying a roller 149 at its end bearing against the periphery of a disk cam 150, one of which is fixed to the shaft 11 at either end thereof. Just as the type rolls complete their rotation, a rise 151 on each cam 150 causes the actuation of the platen levers, moving the platen 6 up into firm contact with the type wheel.

*Operation.*—The operation of the machine is summarized as follows: With the dial 20 standing in blank position, the knob 44 is rotated in the direction opposite to the arrow A, Fig. 1, until it stops. The notches in the cams 24 are then in registration with the notches in the driving disks, and the operating shaft 11 locked by reason of engagement of the dog 57 with the stationary plate 61. The setting shaft is next turned to carry the notches in the driving disks past the dogs 14 which drop therein, thereby connecting all the type wheels to the setting shaft. The latter is now turned to bring the character on the dial 20 corresponding to the first word of the amount to be printed, opposite the index 21 and the knob 44 turned until the word "Set" appears in the extreme left aperture 48. The turning of the knob disconnects the left type wheel and the setting shaft 13 is then turned to position the next wheel in the same manner. After the last type wheel is disconnected, the setting shaft is turned to blank position, if it did not then occupy that position, and the dog 57 dropping into the notch 59 in the driving disk 60 establishes connection of the setting shaft with the operating shaft 11. Rotation of the latter through a complete revolution first moves the centering member a sufficient distance to engage between the teeth of the gears 10 and lock the latter to the yoke frame 73. The yoke frame itself remains stationary while the sliding plate 101 carries the shifting slides 99 into engagement with the type bars. The shifters are then moved to push the type bars together, after which the sliding plate 101 is withdrawn and the yoke frame then rotated, moving the printing line set up on the type wheels to a printing position opposite the platen. The latter is then actuated and the impression made on the check. Continuous rotation of the operating shaft will reverse these movements as the cams are symmetrical in shape about a diameter, and, therefore, the operation will be the same no matter in which direction the operating shaft moves.

What is claimed is:

1. In a printing machine, the combination with a series of type carriers, of a manually operable member for differentially setting the various type carriers, manipulative means for successively connecting and disconnecting the type carriers and the member, and means for indicating the carriers connected and disconnected.

2. In a printing machine, the combination with a series of type carriers, of a manually operable driving member common to the type carriers, an operating member, manipulative means for connecting and disconnecting the type carriers and the operating member with the driving member, whereby the operating member can only be connected when the type wheels are disconnected and the type wheels connected when the operating member is disconnected.

3. In a printing machine, the combination with a series of type carriers, of a manually operable driving member common to the type carriers, an operating member, manipulative means for connecting and disconnecting the type carriers and the operating member with the driving member, whereby the operating member can only be connected when the type wheels are disconnected and the type wheels connected when the operating member is disconnected, and an indicating device for indicating whether any individual type carrier is connected or disconnected.

4. In a printing machine, the combination with a series of type carriers, of a manually operable driving member common to the type carriers for differentially setting them, an operating member, means for connecting and disconnecting the type carriers and the operating member with the driving member, and means for preventing the connection and disconnection of the driving member and operating member except in one position of the latter.

5. In a printing machine, the combination with a series of type carriers, of a setting member common thereto, clutches operable to connect and disconnect the type carriers and the setting member, and manipulative means for controlling the clutches.

6. In a printing machine, the combination with a series of type carriers, of a setting member common thereto, clutches operable to connect and disconnect the type carriers and the setting member, a series of cams controlling the clutches, and means for actuating the cams.

7. In a printing machine, the combination with a plurality of type carriers, and a setting member therefor, of clutches for operatively connecting the type carriers with the setting member, an operating member, a clutch for operatively connecting the setting member with the operating member, and means for successively connecting and disconnecting the clutches, the operating member being connected to the setting member only when all of the type wheels are disconnected therefrom.

8. In a printing machine, the combination with a plurality of type carriers, and a setting member therefor, of clutches for operatively connecting the type carriers with the setting member, an operating member, a clutch for operatively connecting the setting member with the operating member, means for successively connecting and disconnecting the clutches, the operating member being connected to the setting member only when all of the type wheels are disconnected therefrom, and means for preventing the connection and disconnection of the setting and operating members except in one position of the latter.

9. In a printing machine, the combination with a plurality of type wheels and a setting member therefor, of spring actuated means for operatively connecting each of the type wheels with the setting member, disconnecting means movable with the setting member for coöperating with the spring actuated means to successively disconnect the setting member and type wheels, and manipulative means for causing a step by step motion of the disconnecting means relative to the setting member.

10. In a printing machine, the combination with a plurality of type wheels and a setting member therefor, of spring actuated means for operatively connecting each of the type wheels thereto, a plurality of cams movable with the setting member and adapted to coöperate with the spring actuated means to successively disconnect the type wheels and setting member when moved relative to the latter, and manipulative means for causing a step by step motion of the cams relative to the setting member.

11. In a printing machine, the combination with a plurality of type wheels and a setting member therefor, of spring actuated means for operatively connecting each of the type wheels thereto, a plurality of cams movable in unison with the setting member and driven thereby, and adapted to coöperate with the spring actuated means to successively disconnect the type wheels and setting member when moved relatively to the latter, differential gearing through which the setting member drives the cams, and manipulative means acting on the differential gearing for effecting a relative step by step movement of the cams and setting member.

12. In a printing machine, the combination with a plurality of type wheels and driving gears therefor, of a rotary setting shaft upon which the driving gears are loosely mounted, clutches for connecting each driving gear with the setting shaft, a series of cams arranged loosely on the shaft and adapted to coöperate with the clutches to disconnect the type wheels, a counter shaft operatively connected to the cams to move them simultaneously, differential gearing connecting the setting shaft to the counter shaft, whereby the cams are driven by the setting shaft in the same direction and with the same speed, and manipulative means acting on the differential gearing for effecting a relative step by step movement of the cams and setting member.

13. In a printing machine, the combination with a plurality of type wheels and driving gears therefor, of a rotary setting shaft upon which the driving gears are loosely mounted, an operating shaft and a driving gear therefor loose on the setting shaft, clutches on the gears adapted to connect the latter to the shaft, cams on the shaft adapted to move relatively thereto and coöperate with the clutches to connect and disconnect the driving gears and the setting shaft, manipulative means for moving all the cams simultaneously to disconnect the type wheels consecutively and, when the last type wheel is disconnected, to connect the operating shaft to the setting shaft.

14. In a printing machine, the combination with a plurality of type carriers having registering grooves in their faces, and type bars carried in the grooves, of means for positioning the carriers so that any type bar on each of the carriers occupies a certain line, a shifter engaging with the end type bar of a line for pushing the type bars together, an inking member for the type carriers, a platen for coöperating with the type carriers, and means for revolving the type carriers to move the type row after the type bars have been pushed together past the inking roll and position it opposite the platen prior to actuation of the latter.

15. In a printing machine, the combination with a plurality of type carriers having registering grooves in their faces, and type bars carried in the grooves, of means for positioning the carriers so that any type bar on each of the carriers occupies a certain line, a type shifter adapted to be moved into engagement with the end type bar of a line for pushing the type bars together, means normally holding the type bars of each type carrier against accidental displacement, and means for releasing the type bars in the line to be set up when the type shifter is moved into engagement with the end type bar.

16. In a check protector, the combination with a plurality of type wheels having type bars thereon, of a movable platen coöperating therewith, an inking member for the type wheels arranged in spaced relation to the printing point, an operating member for causing movement of the platen, and means controlled by the operating member for causing simultaneous movement of the type wheels to carry a certain type bar from the inking member to the printing point prior to the engagement of the platen with the type wheels.

17. In a printing machine, the combination with a series of type carriers, of setting devices therefor, impression taking devices comprising a driving shaft, an operating handle, and manipulative means for connecting either the setting devices or the driving shaft with said handle.

18. In a printing machine, the combination with a series of type carriers, of setting devices therefor, impression taking mechanism, an operating handle, a rotatable shaft, and means controlled by said shaft for connecting either the setting devices or the driving shaft with said handle.

19. In a printing machine, the combination with a type carrier, of a platen, an actuator for the platen, a driving member, and means for operatively connecting either the type carrier or platen actuator with the driving member when the other is disconnected therefrom.

20. In a printing machine, the combination with a type wheel and a platen, of a rotary driving member, and means for operatively connecting either the type wheel or platen with the driving member so as to be actuated by a rotary movement of the latter.

21. In a printing machine, the combination with a series of type wheels, of slidably mounted type bars carried by said wheels, devices for shifting said bars, said devices being normally disengaged from the bars, and means for moving the shifting devices into engagement with the bars.

22. In a printing machine, the combination with a plurality of type carriers having registering grooves in their faces, and type bars carried in the grooves, of means for positioning the carriers so that any type bar on each of the carriers occupies a certain line, a type shifter adapted to be moved into and out of engagement with the end type bar of a line, means for actuating the shifter for pushing the type bars together, and means for locking the shifter against movement longitudinally of the type row before withdrawing it from engagement with the type bar.

23. In a printing machine, the combination with a plurality of type carriers having registering grooves in their faces, and type bars carried in the grooves, of means for positioning the carriers so that any type bar on each of the carriers occupies a certain line, a type shifter adapted to be moved into and out of engagement with the end type bar of a line, means for actuating the shifter for pushing the type bars together, means for locking the shifter against movement longitudinally of the type row before withdrawing it from engagement with the type bar, and means for locking the end type bar when the shifter is withdrawn therefrom.

24. In a printing machine, the combination with a plurality of type carriers having registering grooves in their faces, and type bars carried in the grooves, of means for positioning the carriers so that any type bar on each of the carriers occupies a certain line, a plurality of type shifters adapted to be moved into and out of engagement with the type bars in a line, means for locking the type bars and shifters against movement when they are out of engagement, said means being inoperative when they are in engagement, and an actuator for the shifter engaging the end type bar acting to push all of the type bars in the line together.

25. In a printing machine, the combination with a plurality of type carriers having registering grooves in their faces, and type bars carried in the grooves, of means for positioning the carriers so that any type bar on each of the carriers occupies a certain line, a plurality of type shifters adapted to be moved into and out of engagement with the type bars in a line, means for locking the type bars and shifters against movement when they are out of engagement and unlocking them when they are in engagement, the shifter engaging the end type bar being spring actuated to push all of the type bars in the line together.

26. In a printing machine, the combination with a plurality of type carriers having registering grooves in their faces, and type bars carried in the grooves, of means for positioning the carriers so that any type bar on each of the carriers occupies a certain line, a plurality of type shifters adapted to be moved into and out of engagement with the type bars in the line, means for locking the type bars and shifters against movement when they are out of engagement and unlocking them when they are in engagement, the slide engaging the end type bar being spring actuated in one direction for pushing all the type bars in the line together, and moved positively in the opposite direction to restore all the shifters to their original positions.

27. In a printing machine, the combination with a plurality of type carriers having registering grooves in their faces, and type bars carried in the grooves, of means for positioning the carriers so that any type bar on each of the carriers occupies a certain line, a plurality of type shifters adapted to be moved into and out of engagement with the type bars in a line, means for locking the type bars and shifters against movement when they are out of engagement and unlocking them when they are in engagement, resilient means acting on the slide which engages the end type bar for pushing all the type bars in the line together, and invariably movable means acting on all the shifters for returning them to their initial position.

28. In a printing machine, the combination with a plurality of type carriers having registering grooves in their faces and type bars carried in the grooves, of means for positioning the carriers so that any type bar on each of the carriers occupies a certain set up line, a stationary locking plate arranged adjacent each of the type carriers for preventing accidental movement of the type bars, except those on the set up line, movable detents for preventing movement of the type bars on the set up line, a shifter engaging the end type of the line to push the type bars together, and means for releasing the detents prior to actuation of the shifter.

29. In a printing machine, the combination with a plurality of type wheels having registering grooves in their faces, and type bars carried on the grooves, of a movable platen coöperating therewith, an inking member for the type wheels arranged in spaced relation to the printing point, means for positioning the carriers so that any type bar on each of the wheels can be moved to occupy a set up position, an operating member for causing movement of the platen, and means controlled by the operating member for causing simultaneous movement of the type wheels to carry the type row from the set up position into contact with the inking member, and thence to the printing point prior to the engagement of the platen with the type wheels.

30. In a printing machine, a series of type supports adjustable with reference to a printing line, a series of shiftable type bars in said supports, means for adjusting the supports to set up the type to print the desired words in a line, an abutment to be engaged by the left hand margin of the work sheet, and means for shifting positioned type bars toward said abutment.

31. In a printing machine, a series of type supports adjustable with reference to a printing line, a series of shiftable word type bars of varying lengths in said supports, means for adjusting the supports to set up the type to print the desired words in a line, a fixed abutment to be engaged by the left hand margin of the work sheet, and means for shifting positioned type bars toward said abutment.

32. In a printing machine, the combination with a series of type supports adjustable with reference to a printing line, the left hand one of said supports carrying fixed type forms of varying length and the other slidably mounted bars of different lengths, the fixed type forms forming differential stops for the slidable bars, and means for sliding the slidable bars together and into engagement with the positioned fixed type form.

33. In a printing machine, the combination with a series of type carriers, of a setting member common thereto, means normally connecting all of the type carriers to the setting member and operable to successively disconnect the carriers from said member whereby to leave the respective carriers set in desired positions, and means for correcting the setting of an incorrectly set carrier without disturbing the setting of other carriers.

34. In a printing machine, the combination with a series of independently adjustable type supports, of a setting member common to the supports, means operable to connect the type supports and the setting member in a fixed sequence and disconnect them in an opposite sequence, and means for preventing disconnecting operation of the connecting and disconnecting means in all but one position of the setting member.

35. In a printing machine, the combination with a plurality of type wheels having type bars thereon of a movable platen for taking impressions from the type, an inking member, means for setting the type wheels to position desired bars opposite the inking member, mechanism for shifting the bars relative to their wheels to bring them into close relation, means for simultaneously turning all of the type wheels after the bars are shifted to present the type opposite the platen, and devices for operating the inking member to apply ink to the type during said turning movement.

36. In a printing machine, the combination with a set of type carriers and a setting member common thereto, of connections normally transmitting movements of the setting member to each of the type carriers, a set of cams movable to disable successively the connections between the type carriers and the setting member, and devices for operating the cams.

37. In a printing machine, the combination with a set of type carriers, of a differentially movable shaft, devices normally effective to transmit movements of said shaft to the type carriers, members movable relative to the shaft for successively rendering the devices ineffective, and means for effecting said relative movements of the members.

38. In a printing machine, the combination with a set of type carriers, of a differentially movable shaft and means for moving it differentially in either direction, devices on the shaft normally effective to transmit movements of the shaft to the type carriers, a series of graduated cams mounted on the shaft and progressively movable relative to the shaft to successively render the connecting devices ineffective, and means for effecting the movements of the cams.

39. In a printing machine, the combination with a set of type carriers differentially adjustable to set up various items, of a setting member common to the type carriers, devices normally transmitting movements of the setting member to all of the carriers, a set of cams controlling said devices, and means for operating the cams to successively disable the connecting devices, thereby successively disconnecting the type carriers from the setting member.

40. In a printing machine, the combination with a set of type carriers and a setting member common thereto, of means comprising a set of dogs normally connecting the type carriers and the setting member, and devices for operating the dogs to disconnect the type carriers from the setting member.

41. In a printing machine, the combination with a set of type carriers, of a differentially movable shaft and means for operating same, a pair of disks for each type carrier, one rigid with and the other loose on the shaft, normally effective dogs connecting the loose to the rigid disk, a cam adjacent each pair of disks and movable to operate the associated dog to disconnect the disks, means for effecting this disconnecting movement of the cams, and a type carrier setting gear rigid with each loose disk.

42. In a printing machine, the combination with a set of type carriers, of a differentially movable setting shaft and means for operating the same, a pair of members for each type carrier, one rigid with and the other loose on the setting shaft, normally effective dogs connecting the loose to the rigid member, a cam adjacent each pair of members and movable to operate the associated dog to disconnect the members, means for effecting the disconnecting movements of the cams, and a type carrier setting gear rigid with the loose member.

WALTER B. PAYNE.